Dec. 30, 1958  H. W. SPREITZER  2,866,529
ELECTROMAGNETIC CLUTCH
Filed Jan. 18, 1955  3 Sheets-Sheet 3

INVENTOR.
HENRY W. SPREITZER
BY Hudson, Boughton,
Williams, David & Hoffmann
ATTORNEYS United States Patent Office 2,866,529
Patented Dec. 30, 1958

2,866,529

ELECTROMAGNETIC CLUTCH

Henry W. Spreitzer, Parma, Ohio, assignor to The Warner & Swasey Company, Cleveland, Ohio, a corporation of Ohio Application January 18, 1955, Serial No. 482,577

8 Claims. (Cl. 192—48)

The present invention relates to drive units and, more particularly, to multiple drive units having a plurality of electromagnetically operated friction clutches for interconnecting a shaft and any one of a plurality of members rotatably supported thereon.

In drive units, particularly dual drive units, members such as gear members are often rotatably supported coaxially with or about a shaft and are adapted to be connected in driving relationship with the shaft by electromagnetically operated clutch mechanism or mechanisms coaxial with the shaft, a clutch mechanism, including an electromagnetic coil for operating the mechanism and coaxial with a clutch member thereof, being provided for each member or gear member to be connected to the shaft. Problems have arisen in the use of this type of drive constructed in a conventional manner since the flux of the electromagnetic coil for operating one of the clutch mechanisms also tends to move the other clutch mechanism, if the drive is a dual type drive, to engaged position, creating a drag or braking effect on the drive. Problems have also been encountered in maintaining concentricity of the clutch operating coils with the shaft and in making connections to the coils which are not subject to arcing and similar disadvantages. If proper concentricity of the electromagnetic coils cannot be maintained with respect to the clutch member telescoped therein, the clearance between the coils and any part relatively rotated with respect thereto must be increased to accommodate non-concentricity, requiring an increase in the flux-creating powers of the coil to provide a given force for moving the armature of the coil to a clutch actuated position.

An important object of the present invention is to provide a new and improved drive unit including an electromagnetic coil supported about a rotatable first clutch member for operating clutch means adapted to interconnect the first clutch member and a second clutch member rotatably supported coaxially with the shaft, the coil being supported in a manner to permit lead-in wires to be connected directly to the coil without the use of brushes and the like and in a manner which facilitates and assures concentricity of the coil with the shaft.

Another object of the present invention is to provide a new and improved multiple drive unit, particularly a dual drive unit, in which two electromagnetically operated clutches for connecting a pair of members rotatably supported about a shaft in driving relation with the shaft are arranged coaxially with the shaft and constructed so that the concentricity of the shaft with nonrotatable electromagnetic coils for operating the respective clutches is assured and so that the magnetic flux of the clutch operating electromagnetic coils has no or substantially no tendency to actuate clutches not intended to be operated thereby.

Another object of the present invention is to provide a clutch mechanism for interconnecting a shaft and a member coaxial therewith, the clutch mechanism being supported on the shaft and having a nonrotatable floating support carried by the shaft independently of the frame of the machine for an electromagnetic operating coil energizable to actuate the clutch mechanism whereby the assembly of the clutch in the frame with a high degree of concentricity of the shaft and electromagnetic coil is facilitated.

Another object of the present invention is to provide a new and improved multiple drive unit, particularly a dual drive unit, in which electromagnetically operated clutches for connecting a shaft and members rotatably supported coaxially therewith in driving relationship are so constructed and arranged about the shaft that the magnetic flux of the operating coil of one of the clutches has substantially no effect upon the other clutches.

Further objects and advantages of the present invention become apparent from the following detailed description of drive units embodying the present invention taken in conjunction with the accompanying drawings forming a part of this specification, and in which:

Fig. 1a is an enlarged fragmentary detail view of the electromagnetic coil support member;

Figure 1:
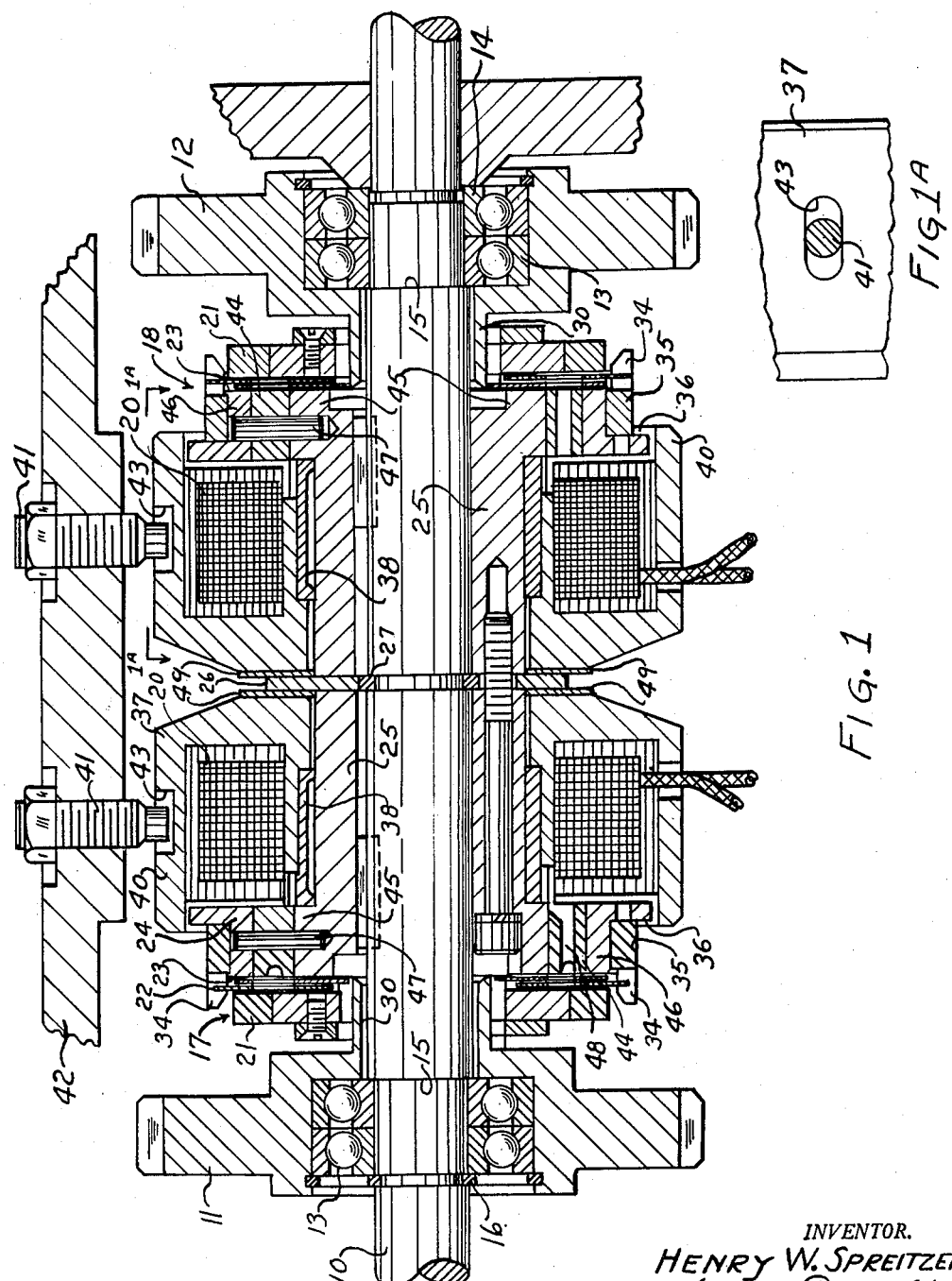
Fig. 1 is a sectional view through a drive unit embodying the preferred form of the present invention.

The present invention is susceptible of various modifications and constructions and of uses in various types of machines where it is desirable to provide a drive for an element or member thereof, particularly a multiple drive such as a two-speed drive for an element of a machine tool, and contemplates the provision of a drive having one or more clutch mechanisms for interconnecting the first clutch member of each clutch mechanism with a second clutch member, the clutch mechanisms having an electromagnetic operating coil positioned coaxial with and about one of the clutch members with bearing means between the latter and the coil permitting relative rotation therebetween. In the illustrated embodiments a shaft is adapted to be selectively driven by either one of two different sized gears rotatably supported on the shaft. The larger gear on the shaft provides the lower shaft speed while the smaller gear drives the shaft at its higher speed. It will be understood, of course, that the direction of drive could be reversed and the shaft used as the driver to selectively provide a low speed drive through the small gear thereon and a high speed drive through the large gear thereon.

Referring to the drawings, the invention is illustrated as embodied in a multiple drive unit for a shaft 10 to be selectively driven from either one of two spaced gear members 11, 12 each rotatably supported on the shaft 10 by suitable antifriction means 13. In the illustrated embodiment, the antifriction means 13 comprises roller bearings having their inner races 14 fixed on a portion of the shaft 10 and held against axial movement with respect thereto by engagement with a shoulder 15 at one side and a snap ring 16 or other abutment means at the other side.

The gear members 11, 12 may be selectively connected to the shaft 10 by clutch mechanisms 17, 18 respectively, each being positioned coaxially about the shaft 10 in side-by-side relationship intermediate the gear members 11, 12. The clutch mechanisms 17, 18, in the illustrated and preferred embodiment, are electromagnetically operated clutch mechanisms of the friction disk type and each comprise an electromagnet including an electromagnetic coil 20 adapted to be energized to move an armature 21 axially of the shaft 10 to clamp a plurality of friction disks 22 intermediate the armature 21 and a pressure or back-up plate 23 formed by the outer side of a flange 24 of a sleeve 25 keyed to the shaft 10 for rotation therewith. The sleeves 25 of the clutch mechanisms 17, 18 are of magnetic material and are positioned in end-to-end relationship on the shaft 10, with the flanges 24 being located at the end of each sleeve remote from the other sleeve, and are separated from each other by an annular plate 26 of nonmagnetic material supported on the shaft 10 by bearing means 27, which bearing means permits relative rotation between the plate 26 and the shaft. The sleeves 25 and the shaft 10 may be said to constitute one of the clutch members, in this case the driven members, of the clutch mechanisms 17, 18.

Each of the gear members 11 and 12 constitutes one of the clutch members, in this case, the driving members, of clutch mechanisms 17, 18 respectively, and each has a sleeve portion 30 coaxial with the shaft 10 and extending therefrom toward the sleeves 25. The sleeve portions 30 support the armatures 21 and the connections between the armatures 21 and the sleeve portions 30 are such that the sleeve portions and armatures thereon rotate together but permit movement of the armature axially of the shaft 10 to clamp the friction disks against flanges 24 of sleeves 25 to connect the gear members 11 and 12 in driving relationship with the shaft 10.

The friction disks 22 constitute clutch means movable to engaged and disengaged positions and are preferably annular, steel, spring disks which inherently position themselves with a space therebetween when the coil 20 for moving them to clutch engaged position is not energized. The disks may each be provided with a plurality of circularly spaced openings 32 for reasons hereinafter pointed out.

Alternate friction disks 22 of each clutch mechanism are splined or similarly connected to projections 34 extending axially of the shaft 10 from the outer peripheries of the flanges 24 with the other friction disks 22 being splined or similarly connected to the sleeve portions 30 of the gear members to permit their movement axially of the shaft 10. Movement of the armature 21 toward the flange 24 causes the clamping of the friction disks between the armature and the outer side of the flange 24 which functions as a back-up plate. If desired, the projections 34 may be part of an annular member 35 positioned about the periphery of the flange 24, the flange having a cut-out or reduced portion 36 to receive the member 35.

Each of the operating coils 20 of the electromagnets is positioned within a magnet or coil body 37 supported on the sleeve 25 of the particular clutch mechanism operated by the coil by a bushing type bearing 38 of conventional bearing means, permitting relative rotation between the sleeve and the magnet body. The magnet body substantially encompasses the electromagnetic coil 20 supported thereon and has an annular peripheral portion 40 which overlies the flange 24 of the sleeve on which the magnet body is positioned with an air gap therebetween. Each of the magnet bodies 37 is held against rotation by means of a screw-pin 41 threaded through a stationary frame member 42 of the machine in which the drive unit is being used, with the end of the screw-pin being received in an axially elongated recess 43 in the outer side of the magnet body 37. The elongated recess 43 has a width equal to the thickness of the end of the screw-pin 41 and permits longitudinal axial movement of the magnet body relative to the screw-pin 41 and the frame member 42. The screw-pin 41 also terminates short of the bottom of recesses 43 to permit movement of the magnet body 37 relative to the frame member 42 in a direction extending radially of the shaft. The support for the magnet bodies 37 permits them to float relative to the frame to maintain concentricity with the shaft 10. If the magnet bodies 37 were fixed to the frame, then the frame and connection between the frame and magnet bodies would have to be constructed to assure concentricity of the magnet body with the shaft and the supporting means therefor and this concentricity would be destroyed upon any deflection whatsoever of the shaft. When, however, the magnet body is carried by the shaft 10, as shown in the drawings, and is free to float relative to the frame member, there is no problem of maintaining the frame member and the connection between the frame member and the magnet body concentric with the shaft. The screw-pins and receiving recesses constitute spaced abutments on the frame and magnet body respectively, permitting relative radial and preferably also longitudinal movement between the frame and the magnet body but preventing continuous rotation of the coil and the magnet body.

It can now be seen that upon energization of one of the electromagnetic coils 20, for example, the coil of clutch mechanism 17, the armature 21 of the mechanism 17 which is of magnetic material will be drawn to the corresponding flange 24 by the magnetic flux which passes through the flange, the armature 21 and the body portion proper of the corresponding sleeve 25. It is desirable that as much of the flux as possible be guided to pass through armatures 21, and for this purpose the flanges 24 are each provided with an annular or ring-like portion 44 of nonmagnetic material. In the illustrated embodiment, the flange 24 comprises a portion 45 integral with the body of the sleeve 25, the annular portion 44, and an outer annular portion 46 telescoped about the annular portion 44 and secured in place by pins 47 of nonmagnetic material which pass through the portions 44, 45, 46. The annular portions 44 may be provided with a plurality of axially extending openings 48 to increase the magnetic reluctance thereof by introducing air gaps in the member. The annular portion 44 is preferably aligned with the annular portion of the coil 20 adjacent thereto so as to prevent the magnetic flux from the coil 20 from being closed in the flange 24 and effectively short-circuiting the armature 21. The circularly spaced openings 32 of disks are also preferably aligned with the annular portion of the corresponding coil 20 to prevent the disks from offering a radial path of low magnetic reluctance.

By mounting the electromagnetic coil 20 in the manner described above, the reluctance of the flux path from the coil through the armature 21 may be materially decreased since the air gap between the flange 24 and the magnet body 37 may be held to a minimum due to the fact that the support for the coil substantially assures that the connection of the magnet body 37 to the frame will not destroy the concentricity of the coil, the sleeve 25, and the shaft 10.

The provision of the annular plate 26 intermediate the sleeves 25 of the clutch mechanisms 17, 18 respectively prevents the flux from the actuating coil of the clutch mechanism 17 from being transmitted through the sleeves 25 and the magnet bodies 37 to the armature 21 of the clutch mechanism 18. If the flux were to be transmitted, the clutch mechanism 17 or 18 would be actuated toward an engaged position upon energization of the coil 20 of the other clutch mechanism and create a drag on the shaft 10. The faces of the magnet bodies 37 adjacent the plate 26 are provided with plates 49 of the hardened material abling the air gaps between the coil and the member to be a minimum. The multiple drive units constructed according to the present invention are so arranged coaxially about a shaft which forms either the driving or driven member of the drive that the flux from the coil for operating one of the clutch mechanisms does not tend to function to actuate the other clutch mechanism to an engaged position.

Further modifications, constructions and arrangements will be apparent to those skilled in the art, and it is my intention to hereby cover all such modifications, constructions and arrangements which fall within the spirit and scope of the present invention.

Having thus described my invention, I claim:

1. In a drive unit of the character described, a rotatable shaft, a member to be connected in driving relationship with said shaft, means supporting said member in coaxial relationship with said shaft and for rotation with respect thereto, clutch means coaxially disposed about said shaft including disk means actuatable to selectively connect and disconnect said shaft and said member in driving relationship, an electromagnetic coil member carried by said shaft and disposed coaxially about said shaft adjacent said disk means for actuating said disk means, bearing means supporting said coil member about said shaft for relative rotation with respect to said shaft, a stationary frame member adjacent to but spaced from said coil member, rigid abutment means on said frame member, rigid abutment means on said coil member cooperating with the abutment means on said frame member to hold said coil member against rotation relative to said frame member but permitting radial and axial movement of said coil member relative to said frame member, one of said abutment means comprising a pin and the other of said abutment means comprising walls spaced the thickness of said pin and having the pin disposed therebetween.

2. In a drive unit as defined in claim 1 wherein said member to be connected in driving relationship with said shaft is telescoped over said shaft and is supported thereon for rotation relative thereto and said coil member is rotatably supported by said bearing means on the member to be connected to said shaft.

3. In a drive of the character described, first and second coaxial clutch members, means supporting said members for rotation independently of each other, disk means coaxial with said members and movable axially thereof to clutch engaged and clutch disengaged positions for selectively connecting said members in driving relationship, bearing means coaxial with and positioned on one of said members, means for actuating said disk means to one of its positions comprising an electromagnetic coil member telescoped over said one member and supported thereon for relative rotation with respect thereto by said bearing means, a frame member adjacent said clutch members, rigid abutment means carried by said frame member, and rigid abutment means on said coil member engageable with said abutment means on said frame member for permitting limited movement of said coil member and in an axial direction with respect to said frame member but preventing rotation of said coil member relative to said frame member, one of said abutment means comprising a rigid pin and the other of said abutment means comprising rigid walls spaced the thickness of the pin with the pin being disposed therebetween, said walls being disposed to engage opposite parts of said pin to prevent rotation of said coil member relative to said frame member and said pin having clearance adjacent the other parts of the pin received by said abutment means to permit said limited movement.

4. In a drive as defined in claim 3 wherein said clutch members are disposed in telescoped relationship and said bearing means comprises a bearing member supported on the inner one of said telescoped clutch members for rotation relative thereto and is connected to said coil member to support the latter in a cantilevered manner, the outer one of said telescoped clutch members being disposed between said coil member and the inner one of the telescoped clutch members.

5. In a drive unit of the character described, first and second clutch mechanisms having separate coaxially positioned first clutch members and a common second clutch member comprising a shaft coaxial with said first clutch members, means for supporting said clutch members for rotation independently of each other, a first disk means coaxial with said second clutch member and axially movable to clutch engaged and clutch disengaged positions for selectively connecting the first clutch member of said first clutch mechanism with said second clutch member, second disk means coaxial with said shaft and axially movable to clutch engaged and disengaged positions for selectively connecting the first member of said second clutch mechanism to said second clutch member, a first electromagnetic coil member coaxial with said members adjacent said first disk means for operating said first disk means to one of its positions, bearing means on one of the clutch members of said first clutch mechanism supporting said first electromagnetic coil member thereabout and permitting relative movement of said one member with respect to said coil, a second electromagnetic coil member coaxial with said clutch members adjacent said second disk means for actuating said second disk means to one of its positions, bearing means on one of the clutch members of said second clutch mechanism supporting said second electromagnetic coil member thereabout and permitting relative rotation between said one member of said second clutch mechanism and said coil member, a frame member extending adjacent to but spaced from said coil members, rigid abutment means on said frame member, and rigid abutment means on said first and second coil members engageable with the abutment means on said frame member for holding said coil members against rotation in either direction but permitting limited radial and axial movement of the latter with respect to said frame member.

6. In a drive unit as defined in claim 5 wherein said first clutch members are supported on said shaft for rotation relative thereto.

7. In a drive as defined in claim 6 wherein the bearing means for supporting the coil members of the first and second clutch mechanisms is a common antifriction bearing means having an inner race fixed to said shaft and an outer race fixed to said first and second electromagnetic coil members.

8. In a drive of the character described, first and second clutch mechanisms having separate coaxial first clutch members and a common second clutch member comprising a shaft coaxial with said first clutch members, means supporting said clutch members for rotation independently of each other, a first and second electromagnetic coil members for operating said first and second clutch mechanisms respectively and each positioned about one of the clutch members of the clutch mechanism operated thereby, bearing means supporting said first and second electromagnetic coil members on the said one clutch member of said first and second clutch mechanisms respectively about which they are positioned and permitting relative rotation therebetween, the said one clutch members of said first and second clutch mechanisms having radially extending flanges adjacent an end of said first and second coil members respectively and spaced therefrom, disk means adjacent the side of each said flanges remote from the electromagnetic coil member positioned adjacent thereto for interconnecting the one clutch member of said first and second clutch mechanisms with the other clutch member thereof, said disk means being coaxial with said clutch members and axially movable to clutch engaged and disengaged positions and being movable to one of said positions upon adapted to bear against the plate 26 and prevent wear of the magnet bodies 37.

Figure 2:
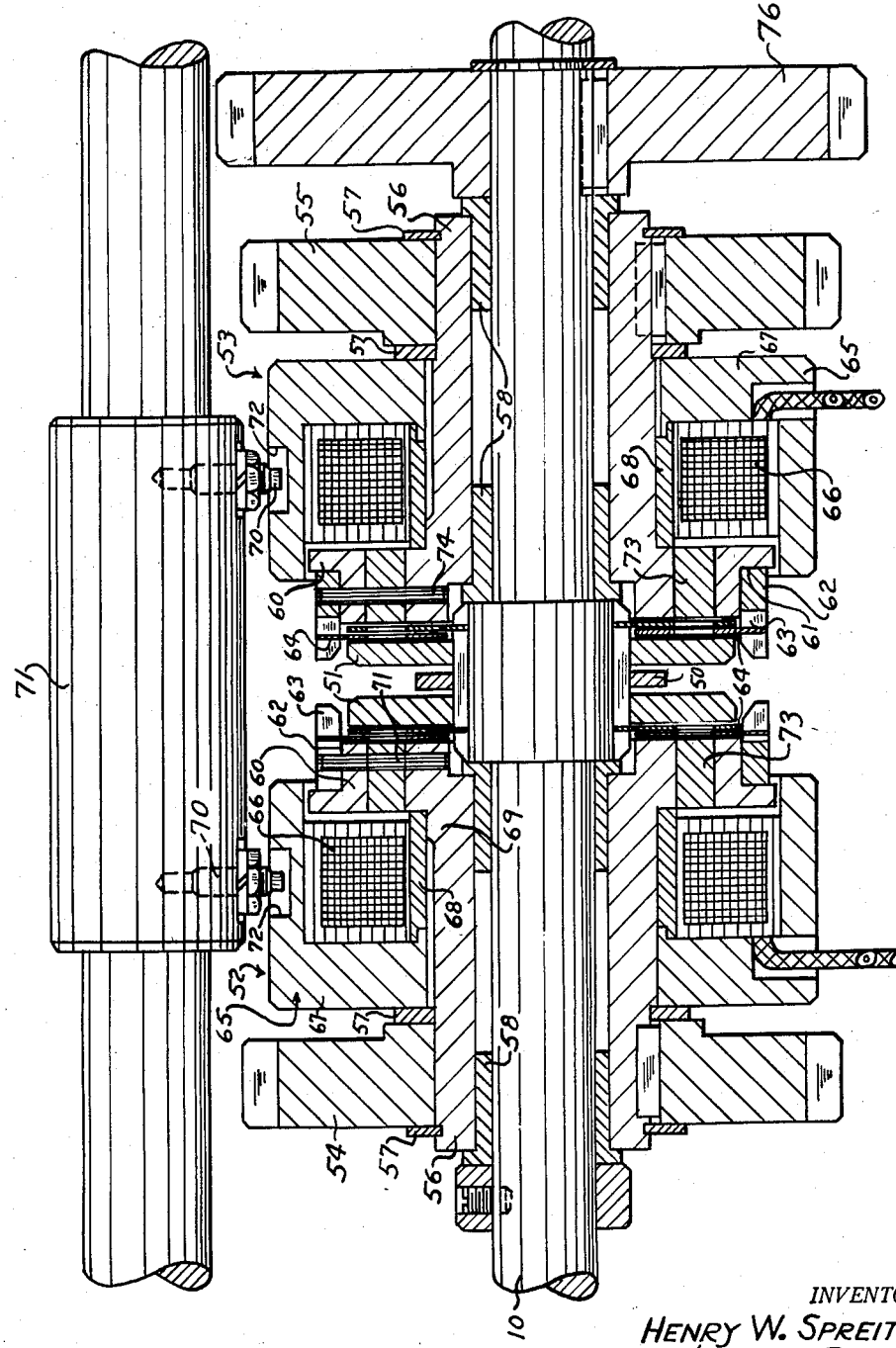
Fig. 2 is a sectional view through a drive unit embodying a modified form of the present invention.

In the form of the drive unit illustrated in Fig. 2, shaft 10 to be driven is provided with a spline portion 50 adapted to support armatures 51 of electromagnetically operated clutch mechanisms 52, 53 positioned on opposite sides of the portion 50 for interconnecting the shaft 10 and gears 54, 55 respectively. The gears 54, 55 are each supported on sleeves 56 for rotation therewith and are held against movement with respect thereto by rings 57. The sleeves 56 of each of the clutch mechanisms 52, 53 are supported on the shaft 10 at opposite sides of the spline portion 50 of the shaft 10 by bearings 58 of the bushing type, there being a bearing located at each of the ends of the sleeves 56.

The sleeves 56 each have a radially extending flange 60 at the end thereof adjacent to the spline portion 50 and the armatures 51. The flange 60 of each of the clutch mechanisms 52, 53 is provided with a recessed or cut-out portion 61 adapted to support a ring 62 having a plurality of axially extending projections 63 spaced therearound. The outer side of the flange 60 forms a back-up plate or pressure member adapted to cooperate with the armature 51 of the particular clutch mechanism in a manner to clamp a plurality of friction disks 64 positioned coaxially about the shaft 10 intermediate the flange 60 and the armature 51 and alternately connected to the projections 63 and the spline portion 50 by means permitting movement of the friction disks axially of the shaft 10. The disks 64 are preferably similar to those of the first described embodiment.

Each clutch mechanism includes an electromagnet 65 for moving the armature 51 thereof to a position clamping the friction disks 64 against the flange 60 to connect the sleeve 56 thereof to the shaft. The electromagnets 65 each includes an electromagnetic coil 66 and a magnet body 67 supported about the corresponding sleeve 56 for relative rotation with respect thereto. Each electromagnetic coil 66 is positioned adjacent the inner side of the corresponding flange 60 and the lower portion 68 of the magnet body 67 thereof is formed of bearing material and is adapted to ride on a portion 69 of the sleeve 56 adjacent the inner side of the flange 60. Rotation of each magnet body 67 is prevented by a stud 70 threaded into a frame member 71 of the machine in which the drive is being used and having its outer end received in an elongated recess 72 in the magnet body. The recess 72 is of a size to provide clearance between the outer end of the stud 70 positioned therein and the magnet body and to permit axial and radial movement of the particular magnet body with respect to the frame.

When the electromagnetic coil 66 of either of the clutch mechanisms 52, 53 is energized, the flux from the magnetic coil extends through the corresponding flange 60, the adjacent friction disks 64, the corresponding armature 51 and the body portion of the sleeve 56 of the particular clutch mechanisms to cause the armature 51 to move to a clutch engaged position. As in the first-described embodiment, the flange 60 is provided with an annular portion or ring 73 spaced from the inner and outer peripheries thereof to offer a path of high magnetic reluctance along lines extending radially of the shaft 10. As in the first-described embodiment, the flange 60 preferably comprises three annular portions which are secured together by pins 74 of nonmagnetic material.

The energization of the coil 66 of the clutch mechanism 52 tends in the illustrated embodiment to move the armature 51 of clutch mechanism 53 to a clutch released position. The air gap between the armatures 51 will offer a high reluctance to the passage of the flux, but in the event that it is transmitted, there will be no tendency for the clutch mechanism 53 to act as a drag or brake for the shaft 10 when being rotated through the gear 54. The converse is true when the clutch 53 is energized to connect the gear 55 in driving relationship with the shaft 10. Attention is also called to the fact that since the electromagnetic coils 66 of the respective clutch mechanisms are supported for axial and radial floating with respect to the adjacent frame member, concentricity of the sleeve and the coil is easily attainable, thereby permitting the air gap between the coil 66 and the inner side of the flange 60 of each clutch mechanism to be a minimum.

In the embodiment of Fig. 2, the shaft 10 has been illustrated as driving a gear 76 keyed thereto adjacent the right hand end thereof.

Figure 3:
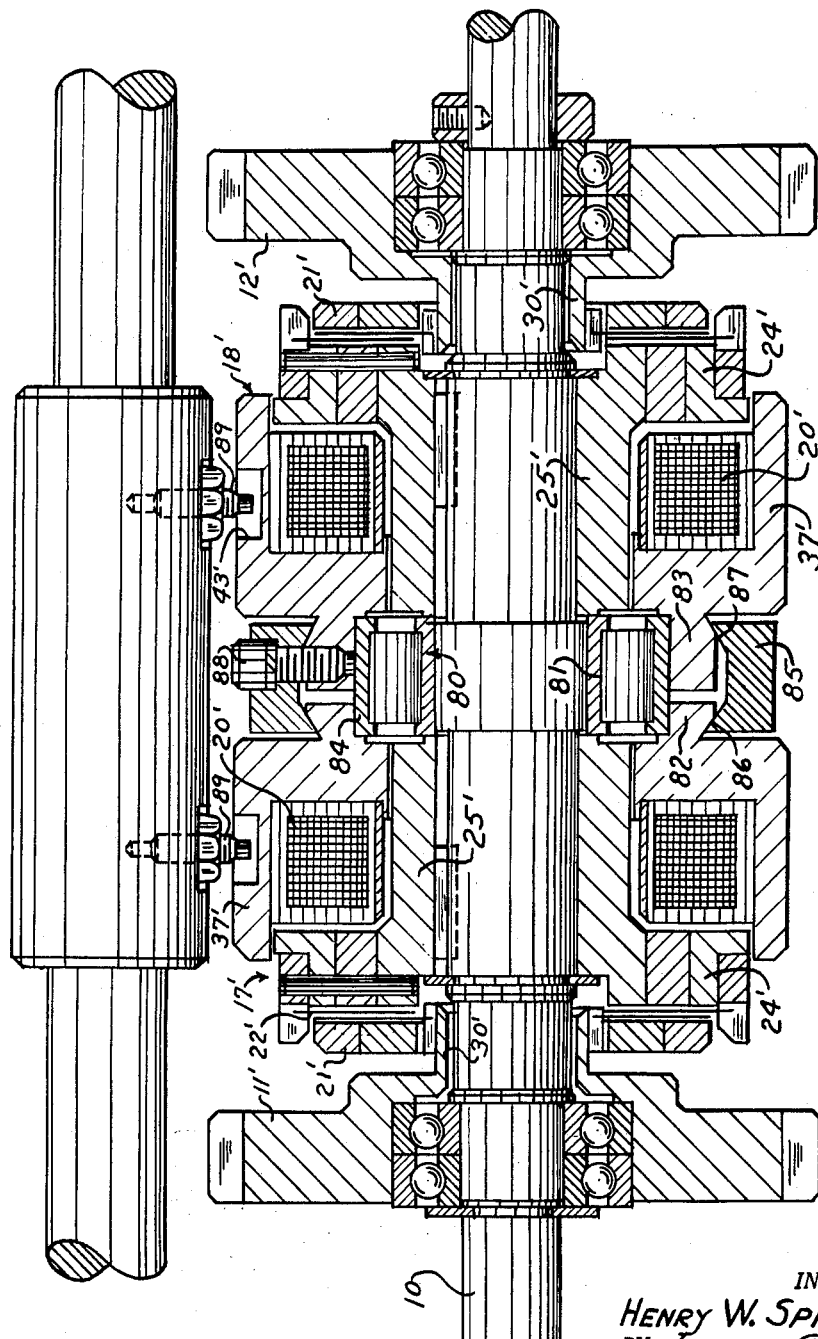
Fig. 3 is a sectional view through a drive unit embodying a second modified form of the present invention.

The dual drive unit for the shaft 10 illustrated in Fig. 3 is similar to the first-described embodiment of the present invention, and the parts corresponding to the parts of the first-described embodiment have been given the same reference numeral with a prime affixed thereto. The shaft 10 is adapted to be driven from either a gear member 11' or a gear member 12' rotatably supported on the shaft 10. Clutch mechanisms 17', 18' are positioned coaxially about the shaft 10 in side-by-side relationship intermediate the gear members 11', 12' and are adapted to interconnect the shaft 10 with the gear members 11', 12' respectively. The clutch mechanisms 17', 18' each comprise a sleeve 25' keyed to the shaft 10 for rotation therewith, an armature 21' splined to a sleeve portion 30' of the corresponding gear member for movement axially of the shaft 10 to clamp friction disks 22' against a flange 24' of the sleeve 25'. The armature 21' of each clutch mechanism is moved to its actuated position by the energization of a coil 20' of an electromagnet supported about the sleeve 25' of the mechanism by a magnet body 37', the coil 20' being positioned adjacent the inner side of the corresponding flange 24'.

The magnet bodies 37' of the clutch mechanisms 17', 18', are supported about the sleeve 25' by antifriction means comprising, in the embodiment of Fig. 3, a roller bearing 80 having its inner race 81 affixed to the shaft 10. The body members 37' of each of the clutch mechanisms 17', 18' are provided with annular ribs 82, 83 respectively, adapted to overlie the outer race 84 of the roller bearing 80. The outer peripheral sides of the annular ribs 82, 83 are tapered radially inwardly of the body members and a two part ring 85 having reversely inclined surfaces 86, 87 adjacent the opposite sides of its inner periphery is adapted to clamp the annular ribs 82, 83 into engagement with the outer race 84 of the roller bearing 81. The rib 83 of the magnet body 37' of the clutch mechanism 18' is of greater lateral extent than the rib 82 and is adapted to threadingly receive a cap screw 88 for clamping the ring 85 onto the surfaces 86, 87 of the magnet bodies 37' of the clutch mechanisms 17', 18' respectively. Rotation of the magnet bodies 37' is prevented by screw studs or screws 89 which thread into a frame member of the machine in which the drive is being used and which have their outer ends received in recesses 43' in the magnet body 37' being held thereby. The recesses 43' permit the magnet body 37' to float axially and radially with respect to the frame in the same manner as the recesses 43 of the embodiment of Fig. 1.

The sleeves 25, 25' of the first and last-described embodiments may be made integral as a single hub member rather than as two separate sleeves if so desired. Two separate sleeves are utilized in the illustrated embodiments to facilitate assembly of the electromagnetic coils about the sleeves.

It may now be seen that the present invention accomplishes the objects hereinbefore set forth and provides a new and improved drive unit in which an electromagnetic coil which is adapted to be energized to connect driving and driven members of a clutch is supported about one of the members by means which facilitates and assures concentricity of the coil with the member, thereby enenergization of the corresponding electromagnetic coil member, a frame member extending adjacent to said coil members, rigid abutment means on said frame member, and rigid abutment means on said first and second coil members engageable with the abutment means on said frame member for preventing rotation of said coil members but permitting limited radial and axial movement of the latter with respect to said frame member, one of said abutment means comprising a pin and the other of said abutment means comprising walls spaced the thickness of the pin and extending parallel to said shaft and having the pin disposed therebetween.

References Cited in the file of this patent

UNITED STATES PATENTS

| | | |
|---|---|---|
| 2,253,309 | Smellie | Aug. 19, 1941 |
| 2,549,214 | Lilja | Apr. 17, 1951 |
| 2,729,318 | Harter | Jan. 3, 1956 |
| 2,732,725 | Brueder | Jan. 31, 1956 |

FOREIGN PATENTS

| | | |
|---|---|---|
| 710,106 | Germany | Sept. 4, 1941 |
| 57,236 | France | Oct. 1, 1952 |

UNITED STATES PATENT OFFICE
CERTIFICATE OF CORRECTION

Patent No. 2,866,529                                            December 30, 1958

Henry W. Spreitzer

It is hereby certified that error appears in the printed specification of the above numbered patent requiring correction and that the said Letters Patent should read as corrected below.

Column 7, line 60, before "and in an axial direction" insert -- in a radial direction --; column 8, line 56, before the words "first and second" strike out "a".

Signed and sealed this 26th day of May 1959.

(SEAL)
Attest:

KARL H. AXLINE                                            ROBERT C. WATSON
Attesting Officer                                       Commissioner of Patents